United States Patent
Takahashi

(10) Patent No.: US 7,991,412 B2
(45) Date of Patent: Aug. 2, 2011

(54) WIRELESS COMMUNICATION DEVICE, PROGRAM, AND WIRELESS COMMUNICATION METHOD

(75) Inventor: Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 578 days.

(21) Appl. No.: 12/142,682

(22) Filed: Jun. 19, 2008

(65) Prior Publication Data

US 2009/0005091 A1 Jan. 1, 2009

(30) Foreign Application Priority Data

Jun. 27, 2007 (JP) ................... P2007-169119

(51) Int. Cl.
*H04B 7/00* (2006.01)

(52) U.S. Cl. .............. 455/500; 455/343.2; 455/574; 455/132; 455/103

(58) Field of Classification Search .............. 455/500, 455/343.2, 574, 132, 103
See application file for complete search history.

(56) References Cited

U.S. PATENT DOCUMENTS

| 7,447,526 B2 * | 11/2008 | Kim et al. ............... 455/574 |
| 7,570,208 B2 * | 8/2009 | Wang et al. ............ 342/357.63 |
| 2004/0253955 A1 | 12/2004 | Love et al. |
| 2005/0250452 A1 | 11/2005 | Walton et al. |
| 2007/0264962 A1 | 11/2007 | Ueno et al. |

FOREIGN PATENT DOCUMENTS

| JP | 2004-032712 | 1/2004 |
| JP | 2005-102136 | 4/2004 |
| JP | 2005-236945 | 9/2005 |
| JP | 2006-303665 | 11/2006 |
| JP | 2007-150653 | 6/2007 |
| JP | 2007-515850 | 6/2007 |
| JP | 2007-536808 | 12/2007 |
| WO | WO2005/002111 A2 | 1/2005 |
| WO | WO2005/114853 | 12/2005 |

* cited by examiner

*Primary Examiner* — Sanh D Phu
(74) *Attorney, Agent, or Firm* — Finnegan, Henderson, Farabow, Garrett & Dunner, L.L.P.

(57) ABSTRACT

A wireless communication device has a plurality of antennas and has MIMO functions that receive a plurality of spatially multiplexed signal sets, perform an inverse matrix computation using SN ratios of the plurality of the signal sets, based on a transfer function of a transmission path of the plurality of the signal sets, decode a first encoded signal in which is encoded the plurality of the signal sets on which the inverse matrix computation was performed, and output a decoded signal. The wireless communication device includes an encoder that generates a second encoded signal by encoding the decoded signal and a control portion that, if one of the SN ratio and the difference between the first encoded signal and the second encoded signal does not meet a specified standard, shifts the wireless communication device to a reduced power consumption state in which the amount of electric power that is consumed is reduced.

8 Claims, 6 Drawing Sheets

WIRELESS COMMUNICATION DEVICE, PROGRAM, AND WIRELESS COMMUNICATION METHOD

CROSS REFERENCES TO RELATED APPLICATION(S)

The present invention contains subject matter related to Japanese Patent Application JP 2007-169119 filed in the Japan Patent Office on Jun. 27, 2007, the entire contents of which being incorporated herein by reference.

BACKGROUND OF THE INVENTION

1. Field of the Invention

The present invention relates to a wireless communication device, a program, and a wireless communication method.

2. Description of the Related Art

In recent years, a wide variety of products such as consumer electronics (CE) devices, mobile devices, and the like have been installed in wireless local area networks (LANs) that are based on the IEEE 802.11 standards.

In a mobile device, in particular, because the battery capacity is limited, it is desirable to reduce the amount of electric power that is consumed. For example, in a case where the mobile device receives a packet that is not addressed to it, it is possible to reduce the amount of electric power that is consumed by cutting off the power to a receiving circuit until a time when it is assumed that the packet has ended. Note that the time when the packet ends can be determined based on packet length information that is carried in an L-SIG field that is included in the packet.

Further, in Japanese Patent Application Publication No. JP-A-2005-236945, a receiver device is described that switches between a normal operation mode and a reduced power consumption mode according to a signal strength of a received signal. Specifically, the receiver device that is described in Japanese Patent Application Publication No. JP-A-2005-236945 operates in the reduced power consumption mode when the signal strength is strong and operates in the normal operation mode when the signal strength is weak.

SUMMARY OF THE INVENTION

However, in some cases, the known receiver device, even when it receives the signal, cannot demodulate the signal properly due to the circumstances of the reception. In this sort of case, where the signal cannot be demodulated properly, the known receiver device receives the signal once again. Therefore, if the known receiver device continues to receive the signal that it cannot demodulate, a problem occurs in that electric power is consumed unnecessarily.

The present invention addresses these problems and provides a wireless communication device, a program, and a wireless communication method that are new and improved and that are capable of shifting to a reduced power consumption state in which the amount of the electric power that is consumed is reduced in accordance with the circumstances of the reception of the signal.

According to an embodiment of the present invention, there is provided a wireless communication device that is provided with a plurality of antennas and has multiple-input, multiple-output (MIMO) functions that receive a plurality of spatially multiplexed signal sets, perform an inverse matrix computation using SN ratios of the plurality of the signal sets, based on a transfer function of a transmission path of the plurality of the signal sets, decode a first encoded signal in which is encoded the plurality of the signal sets on which the inverse matrix computation was performed, and output a decoded signal. The wireless communication device includes an SN ratio estimation portion, an encoder, a transfer function update portion, and a control portion. The SN ratio estimation portion estimates the SN ratios of the plurality of the signal sets that are used in performing the inverse matrix computation. The encoder generates a second encoded signal by encoding the decoded signal. The transfer function update portion updates the transfer function based on the second encoded signal that is generated by the encoder. In a case where one of the SN ratio that is estimated by the SN ratio estimation portion and the difference between the first encoded signal and the second encoded signal does not meet a specified standard, the control portion shifts the state of the wireless communication device to a reduced power consumption state in which the amount of electric power that is consumed is reduced.

In this configuration, the SN ratio estimation portion estimates the SN ratios of the plurality of the signal sets that are used in performing the inverse matrix computation, and the encoder generates the second encoded signal by encoding the decoded signal. A determination of whether or not a properly decoded signal has been derived from the plurality of the signal sets can be made based on one of the SN ratio that is estimated by the SN ratio estimation portion and the difference between the first encoded signal and the second encoded signal. Therefore, in a case where one of the SN ratio of the plurality of the signal sets and the difference between the first encoded signal and the second encoded signal does not meet the specified standard, the control portion may shift the state of the wireless communication device to a reduced power consumption state in which the amount of electric power that is consumed is reduced. This makes it possible to improve electric power efficiency by reducing the amount of electric power that is consumed in receiving a signal that is not properly decoded.

The reduced power consumption state may be a state in which the supply of electric power to one of a part of the wireless communication device and the entire wireless communication device is cut off. In the configuration, the supply of electric power to one of a part of the wireless communication device and the entire wireless communication device is cut off when the wireless communication device shifts to the reduced power consumption state, so a reduction in the amount of electric power that is consumed is achieved.

The reduced power consumption state may also be a state in which the supply of electric power to one of a part of the wireless communication device and the entire wireless communication device is cut off intermittently. In the configuration, the supply of electric power to one of a part of the wireless communication device and the entire wireless communication device is cut off intermittently when the wireless communication device shifts to the reduced power consumption state. It is therefore possible to detect the receiving of a new signal during the time when electric power is being supplied to the wireless communication device, even as the reduction in the consumption of electric power is achieved.

The reduced power consumption state may also be a state in which the receiving of the plurality of the signal sets by at least one of the plurality of antennas is stopped. In the configuration, the receiving of the plurality of the signal sets by at least one of the plurality of the antennas is stopped when the wireless communication device shifts to the reduced power consumption state. It is therefore possible for an antenna that is not stopped to detect the receiving of a new signal, even as the reduction in the consumption of electric power is achieved.

The reduced power consumption state may also be a state in which the number of the signal sets in the plurality of the signal sets is reduced.

The wireless communication device may also include a counter that, based on signal information that is included in the plurality of the signal sets, counts a remaining time until the receiving of the plurality of the signal sets will end. The control portion may cancel the reduced power consumption state of the wireless communication device after the remaining time that the counter counts runs out. In this configuration, the control portion shifts the wireless communication device to the reduced power consumption state for a period of time during which it is assumed that the plurality of the signal sets is being received for which it has been determined that the specified standard is not met. After the period of time during which it is assumed that the plurality of the signal sets is being received for which it has been determined that the specified standard is not met, the control portion can cancel the reduced power consumption state and prepare to receive a new signal.

According to another embodiment of the present invention, there is provided a program that causes a computer to function as a wireless communication device that is provided with a plurality of antennas and has MIMO functions that receive a plurality of spatially multiplexed signal sets, perform an inverse matrix computation using SN ratios of the plurality of the signal sets, based on a transfer function of a transmission path of the plurality of the signal sets, decode a first encoded signal in which is encoded the plurality of the signal sets on which the inverse matrix computation was performed, and output a decoded signal. The wireless communication device includes an SN ratio estimation portion, an encoder, a transfer function update portion, and a control portion. The SN ratio estimation portion estimates the SN ratios of the plurality of the signal sets that are used in performing the inverse matrix computation. The encoder generates a second encoded signal by encoding the decoded signal. The transfer function update portion updates the transfer function based on the second encoded signal that is generated by the encoder. In a case where one of the SN ratio that is estimated by the SN ratio estimation portion and the difference between the first encoded signal and the second encoded signal does not meet a specified standard, the control portion shifts the state of the wireless communication device to a reduced power consumption state in which the amount of electric power that is consumed is reduced.

The program can cause the functions of the SN ratio estimation portion, the encoder, the control portion, and the like to be implemented in the hardware resources of the computer, including a CPU, a ROM, a RAM, and the like, for example. That is, it is possible to cause the computer that uses the program to function as the wireless communication device described above.

According to another embodiment of the present invention, there is provided a wireless communication method for a wireless communication device that is provided with a plurality of antennas and has MIMO functions that receive a plurality of spatially multiplexed signal sets, perform an inverse matrix computation using SN ratios of the plurality of the signal sets, based on a transfer function of a transmission path of the plurality of the signal sets, decode a first encoded signal in which is encoded the plurality of the signal sets on which the inverse matrix computation was performed, and output a decoded signal. The wireless communication method includes a step of estimating the SN ratios of the plurality of the signal sets that are used in performing the inverse matrix computation. The wireless communication method also includes a step of generating a second encoded signal by encoding the decoded signal. The wireless communication method also includes a step of shifting the state of the wireless communication device, in a case where one of the SN ratio that is estimated for the plurality of the signal sets and the difference between the first encoded signal and the second encoded signal does not meet a specified standard, to a reduced power consumption state in which the amount of electric power that is consumed is reduced.

According to the embodiments of the present invention described above, it is possible to shift, in accordance with the signal reception circumstances, to the reduced power consumption state in which the amount of electric power that is consumed is reduced.

DETAILED DESCRIPTION OF THE PREFERRED EMBODIMENTS

Figure 1:
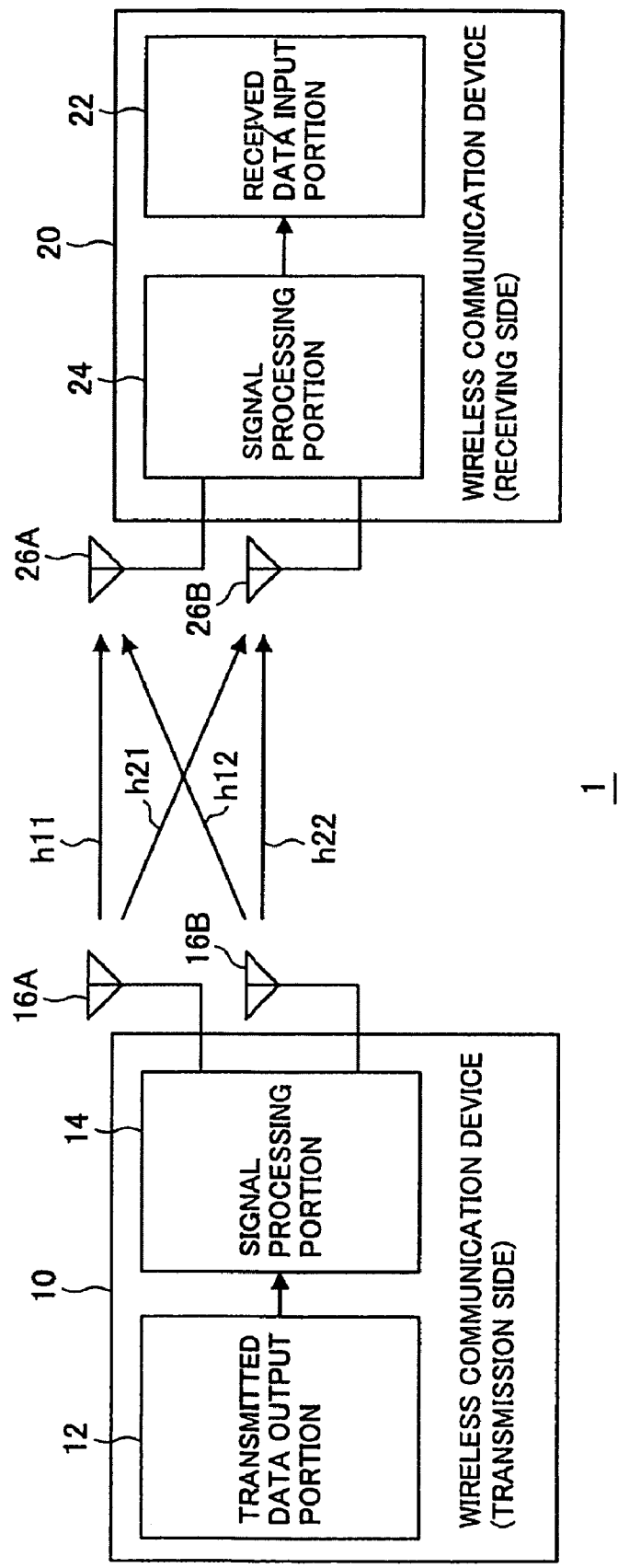
FIG. 1 is an explanatory figure that shows a configuration of a wireless communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiments of the present invention will be explained in the order shown below.

(1) Overview of a wireless communication system according to the present embodiment (2) Explanation of a wireless communication device that is a configuring element of the wireless communication system (2-1) Background of the present embodiment (2-2) Configuration of the wireless communication device (2-3) Examples of a reduced power consumption state (2-4) Standards for shifting to the reduced power consumption state (2-5) Operation of the wireless communication device (3) Conclusion (1) Overview of a Wireless Communication System According to the Present Embodiment First, an overview of a wireless communication system 1 according to the present embodiment will be explained with reference to FIG. 1.

FIG. 1 is an explanatory figure that shows a configuration of the wireless communication system 1 according to the present embodiment. The wireless communication system 1 includes a transmission side wireless communication device 10 and a receiving side wireless communication device 20. Both the wireless communication device 10 and the wireless communication device 20 have multiple-input, multiple-output (MIMO) functions.

The wireless communication device 10 includes a transmitted data output portion 12, a signal processing portion 14, an antenna 16A, and an antenna 16B. The transmitted data output portion 12 outputs to the signal processing portion 14 various types of data for wireless transmission to the wireless communication device 20. The various types of data may be, for example, audio data such as music, a lecture, a radio program, or the like, video data such as a motion picture, a television program, a video program, a photograph, a document, a painting, a diagram, or the like, or miscellaneous data, such as a game, software, or the like.

The signal processing portion 14 modulates the data that is input from the transmitted data output portion 12. The antennas 16A and 16B transmit, as wireless signals, the data that has been modulated by the signal processing portion 14. That is, the wireless communication device 10 divides the data into a plurality of signal sets and performs spatial multiplexing by transmitting each signal set from the antennas 16A and 16B.

The wireless communication device 20 includes antennas 26A and 26B, a signal processing portion 24, and a received data input portion 22. The antennas 26A and 26B receive the spatially modulated wireless signals that are transmitted from the antennas 16A and 16B of the wireless communication device 10.

The signal processing portion 24 can obtain the data (a demodulated signal) by separating the wireless signals that are received by the antennas 26A and 26B into the signal sets that were transmitted by the antennas 16A and 16B and demodulating the signals. The signal processing portion 24 inputs the demodulated data it obtains to the received data input portion 22. The method by which the signal processing portion 24 separates the wireless signals will be explained briefly.

The signal that is transmitted from the antenna 16A of the wireless communication device 10 is termed x1, and the signal that is transmitted from the antenna 16B is termed x2. The signal that is received by the antenna 26A of the wireless communication device 20 is termed r1, and the signal that is received by the antenna 26B is termed r2. Further, the characteristic of the transmission path between the antenna 16A and the antenna 26A is termed h11, and the characteristic of the transmission path between the antenna 16A and the antenna 26B is termed h21. The characteristic of the transmission path between the antenna 16B and the antenna 26A is termed h12, and the characteristic of the transmission path between the antenna 16B and the antenna 26B is termed h22. In this case, the relationship between the signals that are transmitted from the wireless communication device 10 and the signals that are received by the wireless communication device 20 can be expressed by Equation 1 below.

Equation 1

$$\begin{pmatrix} r1 \\ r2 \end{pmatrix} = \begin{pmatrix} h11 & h12 \\ h21 & h22 \end{pmatrix} \begin{pmatrix} x1 \\ x2 \end{pmatrix} \quad \text{Equation 1}$$

In this specification, the first term on the right side of Equation 1 is sometimes called a channel matrix (transfer function) H. The transfer function H can be derived in the wireless communication device 20 by having the wireless communication device 10 transmit a known signal before it transmits x1 and x2.

Once the channel matrix H is derived, the signal processing portion 24 can use an inverse matrix of the channel matrix H to infer x1, the signal that is transmitted from the antenna 16A, and x2, the signal that is transmitted from the antenna 16B.

Thus the wireless communication device 10 and the wireless communication device 20 are each provided with a plurality of the antennas. The communication method by which the wireless communication device 10 and the wireless communication device 20 perform the transmission and the receiving of the plurality of the signal sets is classified as a MIMO communication method. The MIMO communication method is effective in that it improves the transmission speed in proportion to the number of the antennas, without widening the frequency band that is used.

Note that the wireless communication device 10 and the wireless communication device 20 may each be an information processing device such as a personal computer, a home video processing device (a DVD recorder, a video deck, or the like), a mobile telephone, a Personal Handyphone System (PHS), a mobile music playback device, a mobile video playback device, a personal digital assistant (PDA), a home game device, a mobile game device, a household appliance, or the like.

(2) Explanation of the Wireless Communication Device that is a Configuring Element of the Wireless Communication System Next, the wireless communication device 20 in the wireless communication system 1 will be explained. Specifically, the background of the wireless communication device 20 according to the present embodiment will be explained, after which the configuration and the operation of the wireless communication device 20 will be explained in detail.

(2-1) Background of the Present Embodiment

A receiver device that is related to the present embodiment, in a case where it receives a packet that is not addressed to it, can reduce the amount of electric power that is consumed by cutting off the power to a receiving circuit until a time when it is assumed that the packet has ended. This will be explained in greater detail with reference to FIGS. 2 and 3.

Figure 2:
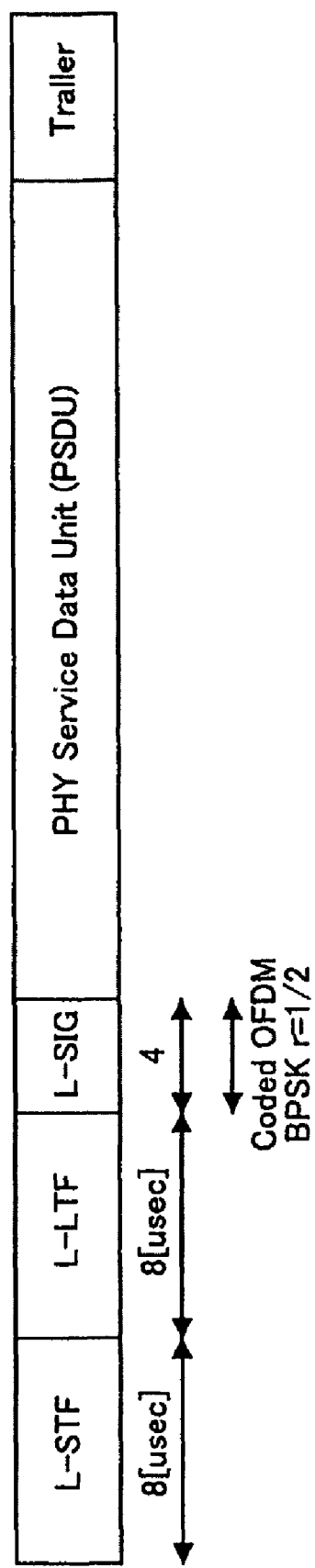
FIG. 2 is an explanatory figure that shows a packet format that is based on the IEEE 802.11a standard.
Figure 3:
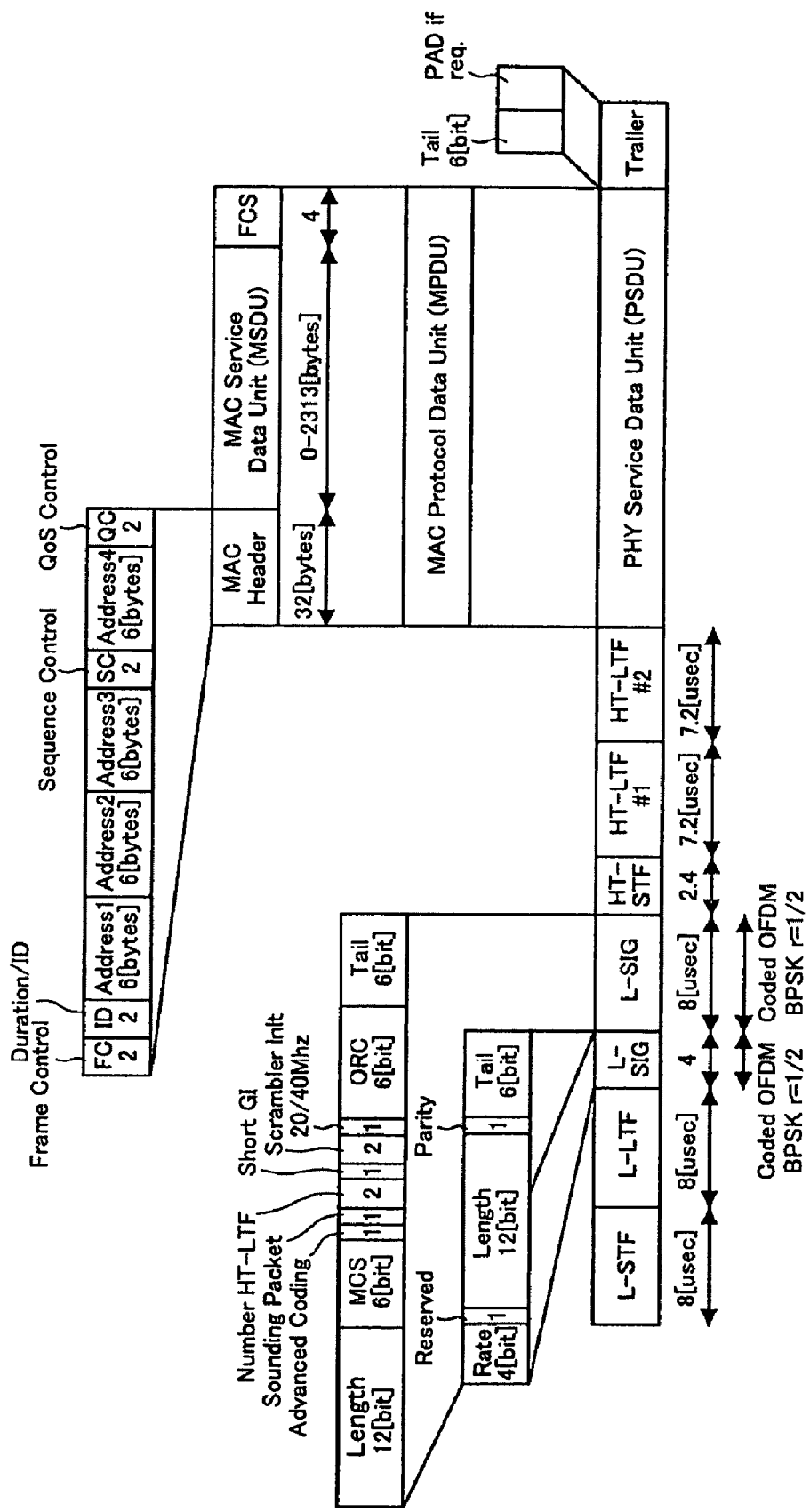
FIG. 3 is an explanatory figure that shows a packet format that is based on the IEEE 802.11n standard.

FIG. 2 is an explanatory figure that shows a packet format that is based on the IEEE 802.11a standard. FIG. 3 is an explanatory figure that shows a packet format that is based on the IEEE 802.11n standard.

In a case where the receiver device receives a packet that is based on the IEEE 802.11a standard and that is not addressed to it, the receiver device determines the packet length, that is, a time when a PSDU and a trailer that are shown in FIG. 2 will end, based on length information that is carried in an L-SIG field that is shown in FIG. 2. The receiver device then cuts off the electric power to the receiving circuit until the time when the packet ends.

In the same manner, in a case where the receiver device receives a packet that is based on the IEEE 802.11n standard and that is not addressed to it, the receiver device determines the packet length based on length information that is carried in an L-SIG field that is shown in FIG. 3. That is, the receiver device determines a time when an HT-STF, HT-LTFs, a PSDU, and a trailer that are shown in FIG. 3 will end, then cuts off the electric power to the receiving circuit until the time when the packet ends.

However, even though the receiver device can inhibit the consumption of electric power in a case where it receives a packet that is not addressed to it, it cannot inhibit the consumption of electric power in a case where it receives a packet that is addressed to it.

The wireless communication device 20 according to the present embodiment was created in consideration of the situation described above. Even in a case where the wireless communication device 20 according to the present embodiment receives a signal that is addressed to it, it can shift to a reduced power consumption state in which the amount of the electric power that is consumed is reduced in accordance with the reception circumstances. The wireless communication device 20 will be explained in detail below.

(2-2) Configuration of the Wireless Communication Device

Figure 4:
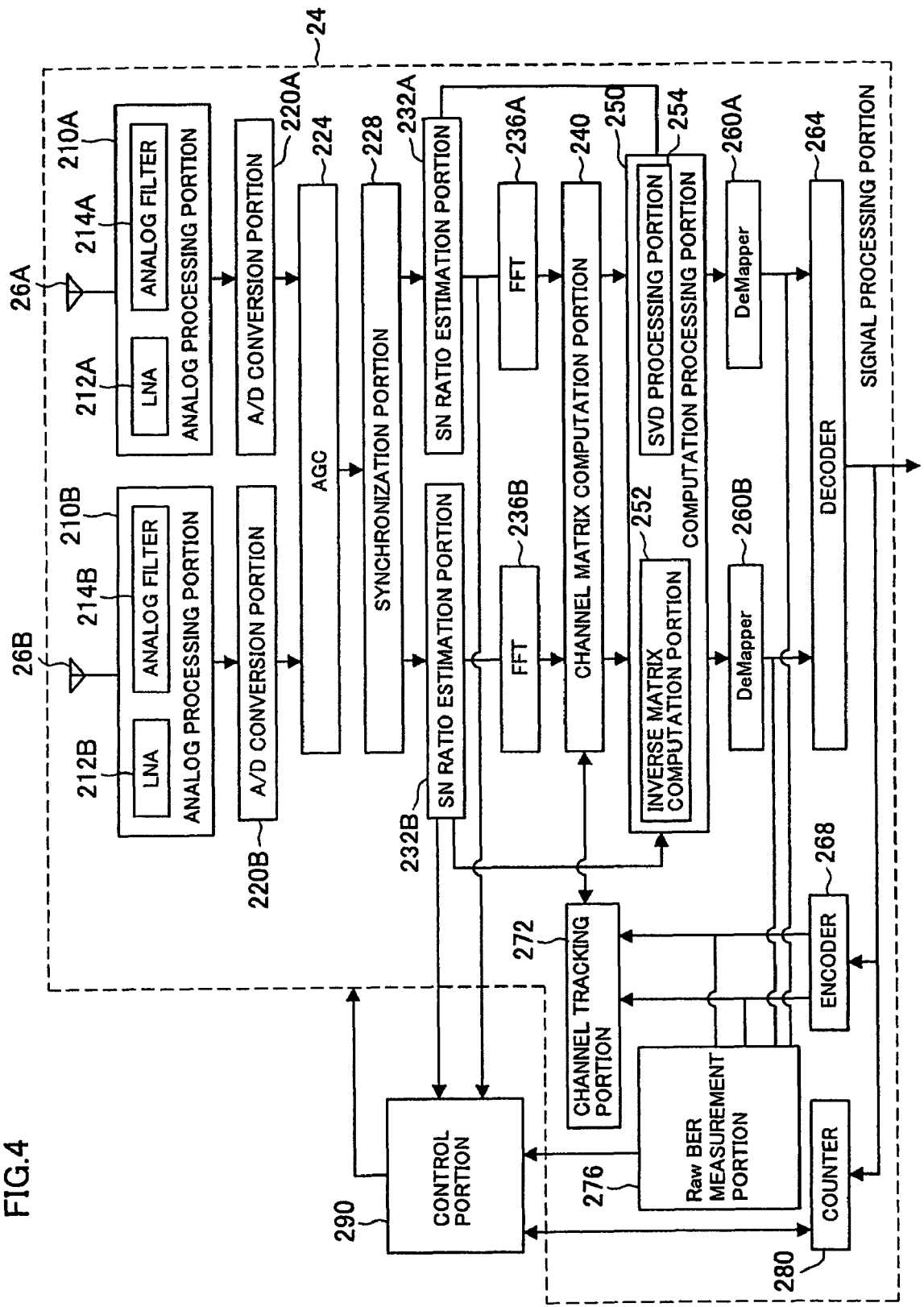
FIG. 4 is a functional block diagram that shows a configuration of a wireless communication device according to the embodiment.

FIG. 4 is a functional block diagram that shows a configuration of the wireless communication device 20 according to the present embodiment. The wireless communication device 20 includes the antennas 26A and 26B, analog processing portions 210A and 210B, A/D conversion portions 220A and 220B, an automatic gain control (AGC) 224, a synchronization portion 228, SN ratio estimation portions 232A and 232B, fast Fourier transforms (FFTs) 236A and 236B, a channel matrix computation portion 240, a computation processing portion 250, demappers 260A and 260B, a decoder 264, an encoder 268, a channel tracking portion 272, a raw bit error rate (BER) measurement portion 276, a counter 280, and a control portion 290. Note that configuring elements for which the same reference numeral is used, but with different alphabetic suffixes (for example, the analog processing portions 210A and 210B), will be explained using only the common reference numeral (for example, 210) in cases where it is not specifically necessary to distinguish between the two elements.

The antennas 26A and 26B receive the plurality of the signal sets that are transmitted from the antennas 16A and 16B. The signal sets that are received by the antenna 26A are output to the analog processing portion 210A, and the signal sets that are received by the antenna 26B are output to the analog processing portion 210B.

Each of the analog processing portions 210 includes a low noise amplifier (LNA) 212 and an analog filter 214. The LNA 212 amplifies the signal component of the signal that is input while suppressing the noise in the signal. The analog filter 214 filters out signal components in unnecessary frequency ranges.

The A/D conversion portions 220 convert the analog processed signals into a digital format. The AGC 224 automatically controls the gain in the signals that are input from the A/D conversion portions 220.

The synchronization portion 228 detects timings of OFDM symbol boundaries, frame boundaries, and the like based on the signal that is input from the AGC 224.

The SN ratio estimation portion 232A estimates the SN ratios of the signals in the signal sets that the antenna 26A receives. The SN ratio estimation portion 232B estimates the SN ratios of the signals in the signal sets that the antenna 26B receives. The SN ratios that are estimated by the SN ratio estimation portions 232A and 232B are output to the computation processing portion 250 and the control portion 290.

The FFTs 236 perform Fourier transforms on the signals that are input from the SN ratio estimation portions 232, based on the timings that are output by the synchronization portion 228.

The channel matrix computation portion 240, based on the signal of each sub-carrier that is derived by the Fourier transforms of the FFTs 236, computes the channel matrix H that indicates the characteristic of the transmission path between the wireless communication device 10 and the wireless communication device 20 (including a propagation environment surrounding the wireless communication device 10 and the wireless communication device 20).

The computation processing portion 250 includes an inverse matrix computation portion 252 and a singular value decomposition (SVD) processing portion 254. The inverse matrix computation portion 252 can derive the plurality of the signal sets that was transmitted from the wireless communication device 10 by performing a computation that uses an inverse matrix of the channel matrix H that is computed by the channel matrix computation portion 240 and the SN ratios that are estimated by the SN ratio estimation portions 232. For example, the computation processing portion 250 can derive the plurality of the signal sets that was transmitted from the wireless communication device 10 based on a minimum mean square error (MMSE) algorithm. The SVD processing portion 254 has a function that breaks down the channel matrix H into an eigenvalue and an eigenvector.

The demapper 260A, based on a constellation, detects signal points that were derived by the computation processing portion 250 from the signal set that was received by the antenna 26A, then outputs, as a first encoded signal, a bit stream that corresponds to the detected signal points. In the same manner, the demapper 260B, based on a constellation, detects signal points that were derived by the computation processing portion 250 from the signal set that was received by the antenna 26B, then outputs, as another first encoded signal, a bit stream that corresponds to the detected signal points.

Note that the constellations differ according to the modulation modes of the signals that are transmitted from the wireless communication device 10. The modulation mode may be, for example, BPSK 1/2, BPSK 3/4, QPSK 1/2, QPSK 3/4, 16QAM 1/2, 16 QAM 3/4, 64QAM 1/2, 64QAM 3/4, or the like.

The decoder 264 decodes the first encoded signals from the demappers 260 and outputs decoded data to the received data input portion 22 and the encoder 268.

The encoder 268 re-encodes the data that was output from the decoder 264, then outputs the re-encoded data as second encoded signals to the channel tracking portion 272. The channel tracking portion 272 functions as a transfer function update portion that, based on the second encoded signals that are output from the encoder 268, causes the channel matrix H to track changes in the characteristic of the actual transmission path.

The raw BER measurement portion 276 measures the bit error rates in the first encoded signals that are input from the demappers 260A and 260B by comparing the first encoded signals with the second encoded signals that are input from the encoder 268. That is, the second encoded signals are encoded based on the data in which the bit errors in the first encoded signals have been corrected by the decoder 264, so it is possible to determine that any differences between the second encoded signals and the first encoded signals are bit errors in the first encoded signals.

The counter 280 determines the time when the signal set ends, based on the length information that is carried in the L-SIG field (signal information) that is contained in the signal set that is received by the antennas 26, as explained above in section (2-1) Background of the present embodiment. For example, the time remaining until the signal set ends is computed by dividing the quantity that is carried in the length information by the transmission rate. The counter 280 also counts the time remaining until the signal set ends.

Note that the counter 280 may count down a count value from the time remaining until the signal set ends, may count up from zero, and may store the time when the signal set ends.

The control portion 290 causes the signal processing portion 24 to shift to the reduced power consumption state, in which the amount of electric power that is consumed is reduced in accordance with the circumstances of the reception of the plurality of the signal sets that is transmitted from the wireless communication device 10. Specific examples of the reduced power consumption state will be explained below, after which examples of standards for shifting to the reduced power consumption state will be explained.

(2-3) Examples of the Reduced Power Consumption State

First Example of the Reduced Power Consumption State

The reduced power consumption state may be a state in which the supply of electric power to one of all or a part of the signal processing portion 24 of the wireless communication device 20 is cut off. That is, when shifting to the reduced power consumption state, the control portion 290 may cut off the supply of electric power to one of all or a part of the signal processing portion 24. For example, the control portion 290 may cut off the supply of electric power to the analog processing portions 210 and the A/D conversion portions 220, which consume comparatively large amounts of electric power. Shifting the wireless communication device 20 to the reduced power consumption state reduces the amount of electric power that is consumed in the wireless communication device 20.

Second Example of the Reduced Power Consumption State

The reduced power consumption state may also be a state in which the supply of electric power is intermittently cut off to one of all or a part of the signal processing portion 24 of the wireless communication device 20. That is, in the reduced power consumption state, the control portion 290 may intermittently cut off the supply of electric power to one of all or a part of the signal processing portion 24. For example, the control portion 290 may intermittently cut off the supply of electric power to one of all or a part of the signal processing portion 24 such that the ratio of the time when the supply of electric power is on to the time when the supply of electric power is off is 1:2, 1:10, or the like. This makes it possible for the signal processing portion 24 to detect a new signal during the time when the electric power is being supplied, even as the consumption of electric power is reduced.

Third Example of the Reduced Power Consumption State

The reduced power consumption state may also be a state in which the receiving of the plurality of the signal sets by at least one of the plurality of the antennas 26A and 26B is stopped. That is, when shifting to the reduced power consumption state, the control portion 290 may stop the operation of at least one of the antennas and of the configuring elements that process the signals that are received by that antenna. This makes it possible for the signal processing portion 24 to detect a new signal that is received by the one of the antennas 26 that is not stopped, even as the consumption of electric power is reduced. Note that the reduced power consumption state may also be a state in which the number of the plurality of the signal sets is reduced. For example, if the number of the signal sets in a normal state is three, the number in the reduced power consumption state may be two.

(2-4) Standards for Shifting to the Reduced Power Consumption State

First Example of Standards for Shifting

The control portion 290 may determine whether or not to shift to the reduced power consumption state based on the SN ratios that are estimated by the SN ratio estimation portions 232. For example, in some cases, where either the SN ratio that is estimated by the SN ratio estimation portion 232A or the SN ratio that is estimated by the SN ratio estimation portion 232B falls below a corresponding set threshold value $\alpha$, the packet that is addressed to the wireless communication device 20 cannot be demodulated properly even if the packet continues to be received. Accordingly, in a case where one of the SN ratio that is estimated by the SN ratio estimation portion 232A and the SN ratio that is estimated by the SN ratio estimation portion 232B falls below the corresponding set threshold value $\alpha$, the control portion 290 may shift the signal processing portion 24 to the reduced power consumption state.

Note that the threshold value $\alpha$ may be a value that is matched to the modulation mode. For example, in the case of a modulation mode with a low bit rate and high noise resistance, the threshold value $\alpha$ may be a high value, and in the case of a modulation mode with a high bit rate and low noise resistance, the threshold value $\alpha$ may be a low value.

Furthermore, even if the SN ratio falls below the threshold value $\alpha$, there is a possibility that the decoding processing in the decoder 264 can correct the bit errors. Therefore, the control portion 290 may also shift the signal processing portion 24 to the reduced power consumption state only when one of a length of time and a ratio of time that the SN ratio is below the threshold value $\alpha$ exceeds a specified value.

The specified value for the one of the length of time and the ratio of time may be a value that is matched to the modulation mode in the same manner as the threshold value $\alpha$. For example, in the case of a modulation mode with a high correction capability, the specified value may be a high value, and in the case of a modulation mode with a low correction capability, the specified value may be a low value.

Second Example of Standards for Shifting

The control portion 290 may determine whether or not to shift to the reduced power consumption state based on the bit error rates of the first encoded signals that are measured by the raw BER measurement portion 276. For example, in some cases, where the bit error rates of the first encoded signals that are measured by the raw BER measurement portion 276 exceed a threshold value $\beta$, the packet that is addressed to the wireless communication device 20 cannot be demodulated properly even if the packet continues to be received. Accordingly, in a case where the bit error rates of the first encoded signals that are measured by the raw BER measurement portion 276 exceed the threshold value $\beta$, the control portion 290 may shift the signal processing portion 24 to the reduced power consumption state.

Note that the threshold value $\beta$ may be a value that is matched to the modulation mode. For example, in the case of a modulation mode with a low bit rate and high noise resistance, the threshold value $\beta$ may be a high value, and in the case of a modulation mode with a high bit rate and low noise resistance, the threshold value $\beta$ may be a low value.

The control portion 290 may also determine whether or not to shift to the reduced power consumption state based on a path metric value from the decoder 264. For example, the control portion 290 may shift to the reduced power consumption state in a case where the dispersal of the values for remaining path metrics is greater than a certain threshold value, that is, where a single optimal path cannot be identified.

The control portion 290 may also determine whether or not to shift to the reduced power consumption state based on a combination of the SN ratios, the bit error rates, the path metric values, and a received signal strength indicator (RSSI).

After shifting the signal processing portion 24 to the reduced power consumption state, the control portion 290 may cancel the reduced power consumption state and shift the signal processing portion 24 to a normal waiting state when the time remaining until the end of the signal set for which the counter 280 is counting runs out.

(2-5) Operation of the Wireless Communication Device

The configuration of the wireless communication device 20 according to the present embodiment has been explained above. Next, the operation of the wireless communication device 20 will be explained with reference to FIGS. 5 and 6.

Figure 5:
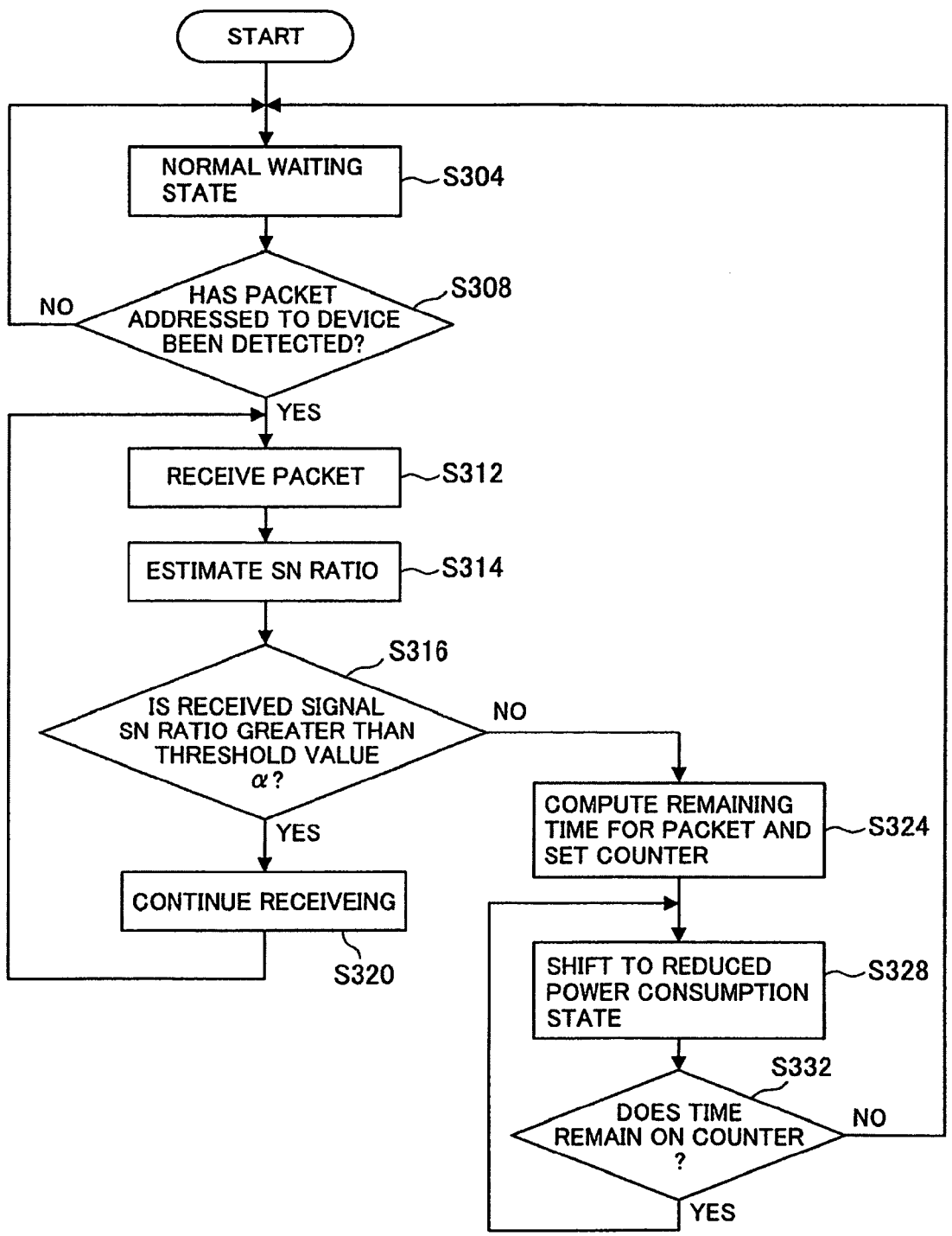
FIG. 5 is a flowchart that shows a flow of a wireless communication method that is implemented in the wireless communication device according to the embodiment.

FIG. 5 is a flowchart that shows a flow of a wireless communication method that is implemented in the wireless communication device 20 according to the present embodiment. First, the wireless communication device 20 operates in the normal waiting state (step S304). Next, the wireless communication device 20 detects a packet that is addressed to it, extracts the length information and a rate that are carried in the L-SIG field, and if a parity check is passed (step S308), performs receiving processing for the packet (step S312).

During the receiving processing, the SN ratio estimation portion 232 estimates the SN ratio of the received signal (step S314). In a case where the SN ratio of the received signal is greater than the threshold value α (step S316), the control portion 290 continues the receiving processing in the signal processing portion 24 (step S320). On the other hand, in a case where the SN ratio of the received signal is less than the threshold value α, the counter 280 computes the time remaining for the packet that has not been received at the time when the SN ratio falls below the threshold value α and starts counting (S324).

Next, the control portion 290 shifts the signal processing portion 24 to the reduced power consumption state and terminates the receiving processing for the packet (step S328). Thereafter, when the time remaining until the end of the signal set for which the counter 280 is counting runs out, the control portion 290 cancels the reduced power consumption state in the signal processing portion and shifts the signal processing portion 24 to the normal waiting state (step S332).

Figure 6:
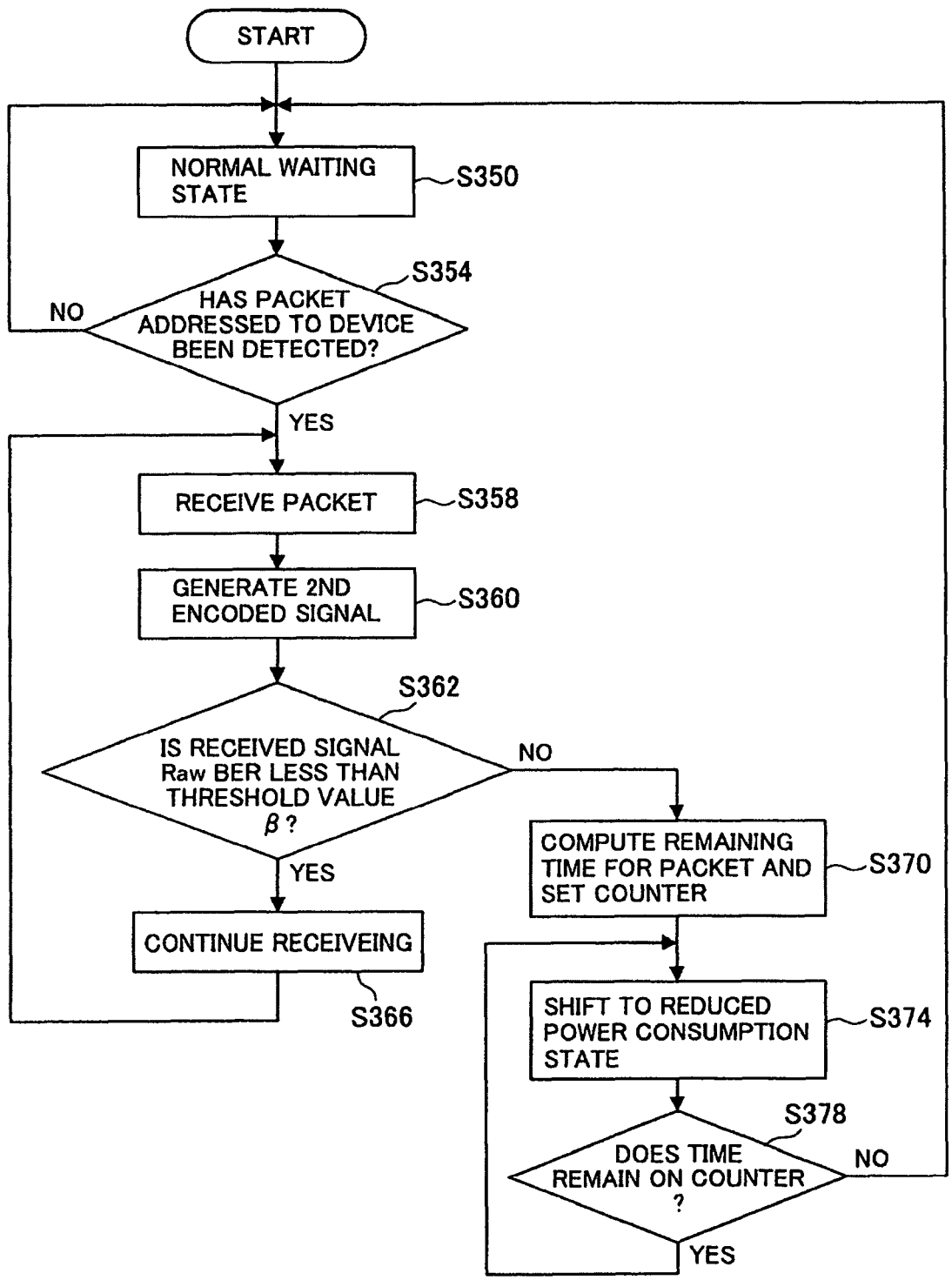
FIG. 6 is a flowchart that shows a flow of another wireless communication method that is implemented in the wireless communication device according to the embodiment.

FIG. 6 is a flowchart that shows a flow of another wireless communication method that is implemented in the wireless communication device 20 according to the present embodiment.

First, the wireless communication device 20 operates in the normal waiting state (step S350). Next, the wireless communication device 20 detects a packet that is addressed to it, extracts the length information and the rate that are carried in the L-SIG field, and if a parity check is passed (step S354), performs the receiving processing for the packet (step S358).

During the receiving processing, the encoder 268 generates the second encoded signal, and the raw BER measurement portion 276 measures the bit error rate of the first encoded signal (step S360). In a case where the bit error rate is less than the threshold value β (step S362), the control portion 290 continues the receiving processing in the signal processing portion 24 (step S366). On the other hand, in a case where the bit error rate exceeds the threshold value β (step S362), the counter 280 computes the time remaining for the packet that has not been received at the time when the bit error rate exceeds the threshold value β and starts counting (S370).

Next, the control portion 290 shifts the signal processing portion 24 to the reduced power consumption state and terminates the receiving processing for the packet (step S374).

Thereafter, when the time remaining until the end of the signal set for which the counter 280 is counting runs out, the control portion 290 cancels the reduced power consumption state and shifts the signal processing portion 24 to the normal waiting state (step S378). Then the wireless communication device 20 notifies the wireless communication device 10 that is the packet transmission source that the receiving of the packet has failed.

(3) Conclusion

As explained above, the control portion 290 of the wireless communication device 20 according to the present embodiment can shift the state of the signal processing portion 24 to the reduced power consumption state, in which the amount of electric power that is consumed is reduced, in accordance with the state of the receiving of the plurality of the signal sets that is transmitted from the other wireless communication device 10. The reduced power consumption state may be one of the state in which the supply of electric power is cut off to one of all or a part of the signal processing portion 24 and the state in which the supply of electric power is cut off intermittently. Therefore, the control portion 290 can reduce the amount of electric power that is consumed by receiving the signal that cannot be decoded properly, thereby improving the electric power efficiency.

The control portion 290 can also determine whether to shift to the reduced power consumption state based on one of the SN ratio that is estimated in the signal processing portion 24 and the bit error rate of the first encoded signal. In other words, the wireless communication device 20 can effectively utilize the existing device configuration of the MIMO functions without providing a new structural element to derive the SN ratio and the bit error rate of the first encoded signal.

The control portion 290 may also stop the operation of at least one of the antennas and of the configuring elements that process the signal that is received by that antenna. This makes it possible for the signal processing portion 24 to detect a new signal that is received by the one of the antennas 26 that is not stopped, even as the consumption of electric power is reduced.

It should be understood by those skilled in the art that various modifications, combinations, sub-combinations and alterations may occur depending on design requirements and other factors insofar as they are within the scope of the appended claims or the equivalents thereof.

For example, in the embodiment above, a case was explained in which the wireless communication device 10 and the wireless communication device 20 are each provided with two antennas. However, the number of antennas with which the wireless communication device 10 and the wireless communication device 20 are each provided may be three or more, and the wireless communication device 10 and the wireless communication device 20 may also have different numbers of antennas.

Furthermore, the individual steps of the processing in the wireless communication device 20 according to this specification do not necessarily have to be performed in a temporal sequence in the order shown in the flowcharts. The individual steps of the processing may also be performed in parallel or individually (for example, in parallel processing or processing according to an object).

Furthermore, the hardware that is built into the wireless communication device 20, such as a CPU, a ROM, a RAM, and the like, can also be created in the form of a computer program for exhibiting functions that are equivalent to the individual configuring elements of the wireless communication device 20 described above. A storage medium can also be provided in which to store the computer program. Moreover, a series of processes can also be implemented in hardware by configuring as hardware each of the functional blocks that are shown in the functional block diagram in FIG. 4.

What is claimed is:

1. A wireless communication device that is provided with a plurality of antennas and has multiple-input, multiple-output (MIMO) functions that receive a plurality of spatially multiplexed signal sets, perform an inverse matrix computation using SN ratios of the plurality of the signal sets, based on a transfer function of a transmission path of the plurality of the signal sets, decode a first encoded signal in which is encoded the plurality of the signal sets on which the inverse matrix computation was performed, and output a decoded signal, the wireless communication device comprising:

an SN ratio estimation portion that estimates the SN ratios of the plurality of the signal sets that are used in performing the inverse matrix computation;

an encoder that generates a second encoded signal by encoding the decoded signal;

a transfer function update portion that updates the transfer function based on the second encoded signal that is generated by the encoder; and a control portion that, in a case where one of the SN ratio that is estimated by the SN ratio estimation portion and the difference between the first encoded signal and the second encoded signal does not meet a specified standard, shifts the state of the wireless communication device to a reduced power consumption state in which the amount of electric power that is consumed is reduced.

2. The wireless communication device according to claim 1,
wherein the reduced power consumption state is a state in which the supply of electric power to one of a part of the wireless communication device and the entire wireless communication device is cut off.

3. The wireless communication device according to claim 1,
wherein the reduced power consumption state is a state in which the supply of electric power to one of a part of the wireless communication device and the entire wireless communication device is cut off intermittently.

4. The wireless communication device according to claim 1,
wherein the reduced power consumption state is a state in which the receiving of the plurality of the signal sets by at least one of the plurality of antennas is stopped.

5. The wireless communication device according to claim 1,
wherein the reduced power consumption state is a state in which the number of the signal sets in the plurality of the signal sets is reduced.

6. The wireless communication device according to claim 1, further comprising:
a counter that, based on signal information that is included in the plurality of the signal sets, counts a remaining time until time receiving of the plurality of the signal sets will end,
wherein the control portion cancels the reduced power consumption state of the wireless communication device after the remaining time that the counter counts runs out.

7. A computer program comprising programming instructions stored in a non-transitory computer readable medium, wherein the computer program, when executed on a computer, controls the computer to function as:

a wireless communication device that is provided with a plurality of antennas and has MIMO functions that receive a plurality of spatially multiplexed signal sets, perform an inverse matrix computation using SN ratios of the plurality of the signal sets, based on a transfer function of a transmission path of the plurality of the signal sets, decode a first encoded signal in which is encoded the plurality of the signal sets on which the inverse matrix computation was performed, and output a decoded signal, the wireless communication device including
an SN ratio estimation portion that estimates the SN ratios of the plurality of the signal sets that are used in performing the inverse matrix computation;
an encoder that generates a second encoded signal by encoding the decoded signal;
a transfer function update portion that updates the transfer function based on the second encoded signal that is generated by the encoder; and
a control portion that, in a case where one of the SN ratio that is estimated by the SN ratio estimation portion and the difference between the first encoded signal and the second encoded signal does not meet a specified standard, shifts the state of the wireless communication device to a reduced power consumption state in which the amount of electric power that is consumed is reduced.

8. A wireless communication method for a wireless communication device that is provided with a plurality of antennas and has MIMO functions that receive a plurality of spatially multiplexed signal sets, perform an inverse matrix computation using SN ratios of the plurality of the signal sets, based on a transfer function of a transmission path of the plurality of the signal sets, decode a first encoded signal in which is encoded the plurality of the signal sets on which the inverse matrix computation was performed, and output a decoded signal, the wireless communication method comprising the steps of:
estimating the SN ratios of the plurality of the signal sets that are used in performing the inverse matrix computation;
generating a second encoded signal by encoding the decoded signal; and
shifting the state of the wireless communication device, in a case where one of the SN ratio that is estimated for the plurality of the signal sets and the difference between the first encoded signal and the second encoded signal does not meet a specified standard, to a reduced power consumption state in which the amount of electric power that is consumed is reduced.

* * * * *